United States Patent [19]
Bürkner
[11] Patent Number: 4,460,082
[45] Date of Patent: Jul. 17, 1984

[54] APPARATUS FOR ALIGNING CHIPS DURING THE MANUFACTURE OF STRANDBOARDS

[75] Inventor: Wolfgang H. Bürkner, Darmstadt, Fed. Rep. of Germany
[73] Assignee: Carl Schenck AG., Fed. Rep. of Germany

[21] Appl. No.: 414,442
[22] Filed: Sep. 2, 1982
[30] Foreign Application Priority Data
Sep. 26, 1981 [DE] Fed. Rep. of Germany ....... 3138462
[51] Int. Cl.[3] ............ B65G 47/24
[52] U.S. Cl. ............ 198/382
[58] Field of Search ............ 198/382, 396, 533

[56] References Cited
U.S. PATENT DOCUMENTS
4,380,285 4/1983 Bürkner et al. ............ 198/533

*Primary Examiner*—Joseph E. Valenza
*Assistant Examiner*—David A. Bucci
*Attorney, Agent, or Firm*—Connolly and Hutz

[57] ABSTRACT

An apparatus for aligning chips in the manufacture of strandboards functions to align the chips in a preferred direction by means of vertical aligning plates arranged parallel to one another and equally spaced apart. Spacing rings, spiked discs, solid discs and spiked discs are alternately arranged in that order and in the same sequence on rotating shafts located above the guide plates. The rotating shafts are arranged perpendicular to the preferred direction of chip deposition and are parallel and at a distance from and adjacent to each other. A mounting for each of the spikes of the spiked discs is proposed for the purpose of accurately maintaining a preferred direction for large chips being processed.

6 Claims, 5 Drawing Figures

APPARATUS FOR ALIGNING CHIPS DURING THE MANUFACTURE OF STRANDBOARDS

BACKGROUND OF THE INVENTION

The present invention relates to spiked discs used to properly distribute chips in the manufacture of strandboards, and more particularly to spiked discs wherein the spikes are mounted to an adjacent solid disc to insure proper holding and guiding of the spikes as they rotate.

Copending application Ser. No. 229,102, filed Jan. 28, 1981 (incorporated herein by reference), now U.S. Pat. No. 4,380,285, relates to apparatus for aligning strands in the production of strandboards into a preferred direction by means of spaced apart vertical aligning plates arranged parallel to one another. According to the inventive concept of that application, it is proposed that spacing rings, spiked discs, solid discs and spiked discs are mounted alternately and in this order on parallel rotating shafts spaced apart from each other above the aligning plates and perpendicular to the preferred direction of travel of the chip shaping conveyor.

As a result of the invention described in the application Ser. No. 229,102, the objective is met of aligning strands for the production of strandboards and to deposit them in this position with preferred deposition of the large chips in the outer zone of each layer.

SUMMARY OF THE INVENTION

It was demonstrated that for different strand sizes, an improvement in the deposition of large chips is still possible especially with respect to accurately maintaining a preferred direction. The solution according to the present invention is accomplished in that each solid disc has mountings for the spikes of the spiked discs on at least one face of the solid disc to thereby position the two spikes at an angular distance of 180° apart. As a result of these mountings, a straight guiding or tracking of the spikes of the spiked discs is attained, and in addition, large components of the strands to be deposited cannot penetrate between the solid disc and the individual spikes of the spiked disc which might otherwise lead to a change in the radial direction of the individual spikes. This may inevitably impair the parallel deposition in the preferred direction and can produce a damaging effect on the spikes by the parallel grid located underneath. Also, when the spikes are made from thermoplastic material, the mountings on the solid disc hold the spikes at the correct position as the spikes rotate. This would not be the case if the thermoplastic spikes were not secured to the solid disc.

The large strands used in these machines may have an area of 20×70 mm on the average and a thickness of about 0.4 mm. This explains that such a strand can very well get caught between a spiked disc and a solid disc which then leads to the above mentioned disadvantages with respect to deposition of chips in the preferred direction.

Further refinements of the invention are that the mountings arranged at an angular distance of 180° are twisted with respect to each other on the two faces of the solid disc at an angle of 90°. This preferred twisting of 90° between the spikes of the spiked discs effects, in particular, that large chips can be easier forwarded by the guiding plates in the preferred direction.

A refinement according to the invention with respect to the solid disc resides in that the solid disc is crimped at an angular distance of 180° as a mounting for the spikes. Instead of crimping of the solid disc, the solid disc according to the invention may carry clips at an angular distance of 180° as mountings for the spikes or the solid disc may have a bore which cooperates with a rivet for fastening the spike.

In order to fasten the crimped clips according to the invention to the solid disc, welding, such as spot welding may be used. Adhesion, screws and rivets may, however, also be used instead of welding.

BRIEF DESCRIPTION OF THE DRAWING

Novel features and advantages of the present invention in addition to those mentioned above will become apparent to those skilled in the art from a reading of the following detailed description in conjunction with the accompanying drawings wherein.

DETAILED DESCRIPTION OF THE INVENTION

Figure 1:
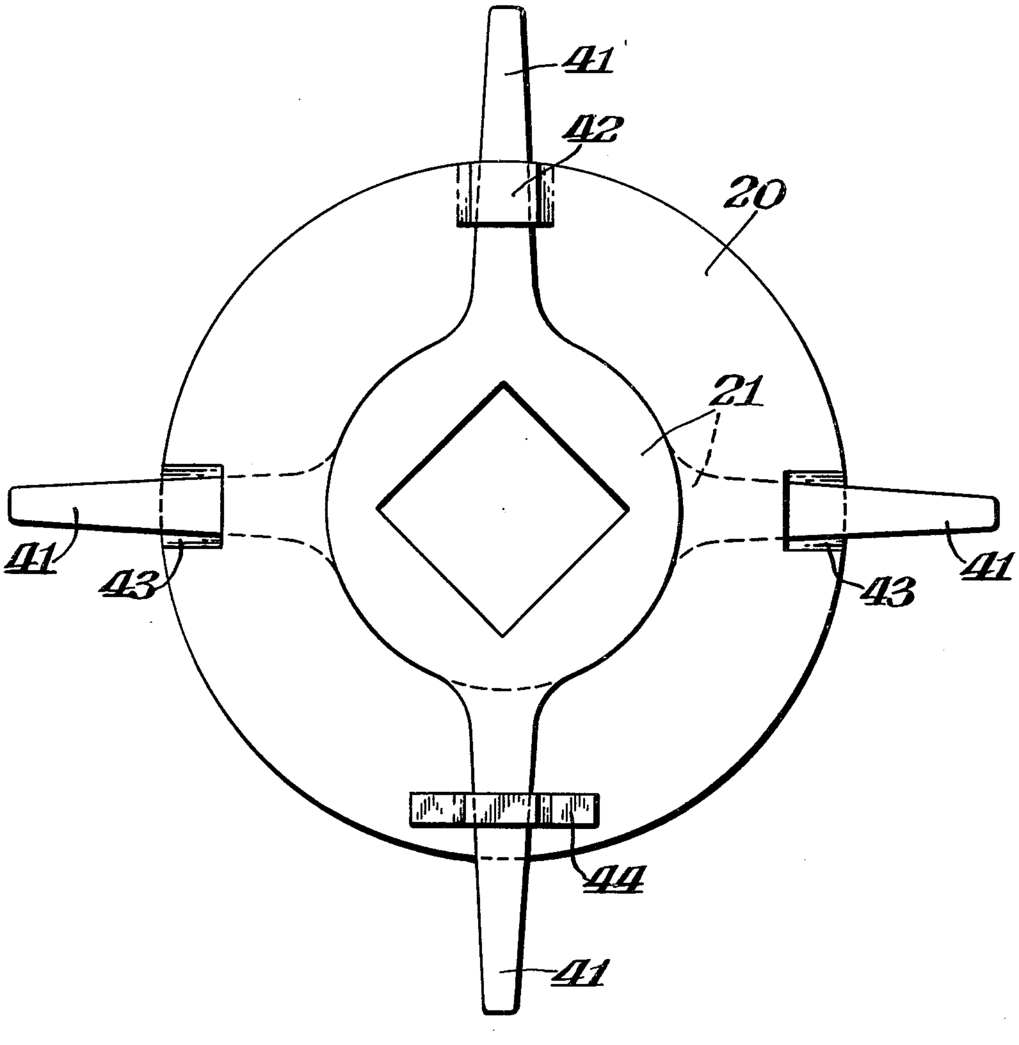
FIG. 1 is a bottom plan view of a solid disc with two spiked discs, according to the present invention.
Figure 2:
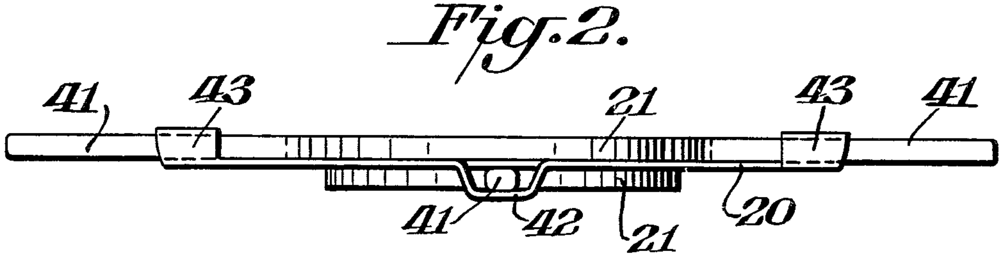
FIG. 2 is a side elevational view of the structure shown in FIG. 1.

FIGS. 1 and 2 show a solid disc 20 with two adjacent spiked discs 21, one on each side of the solid disc. The spiked discs 21 have spikes 41, and in the embodiment shown two spikes are provided per disc 21 and the spikes are spaced 180° from each other. As also shown in FIGS. 1 and 2, the two spiked discs 21 are offset 90° with respect to each other thereby positioning the spikes 41 at 90° from each other. Crimps 42, 43 function to secure the spikes 41 to the solid disc 20. The spikes may be fabricated from thermoplastic material, and as a result of this arrangement, a distinct guiding of the plastic spikes is attained.

In FIG. 1 an alternate embodiment of the innovative guiding of the plastic spikes 41 is also shown in which a clip 44 assumes the holding support of a spike 41 whereby the solid disc 21 may be constructed as an uncrimped smooth disc. In this case, a clip 44 is used to secure each of the spikes 41 to the solid disc 21.

Figure 3:
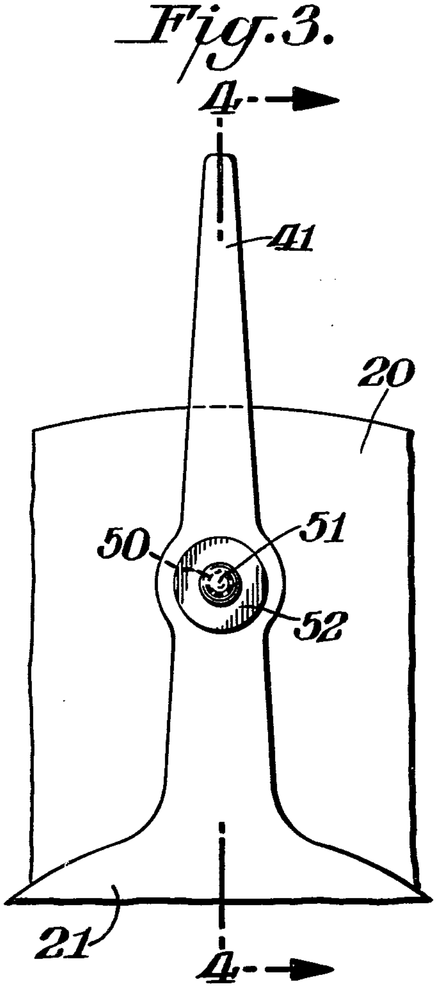
FIG. 3 is a partial plan view of a solid disc with a spike secured thereto, according to the present invention.
Figure 4:
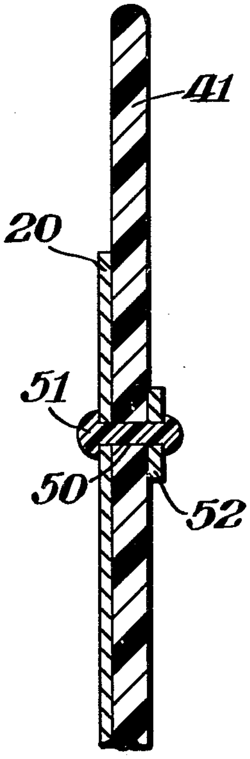
FIG. 4 is a sectional view taken along line 4—4 of FIG. 3.
Figure 5:
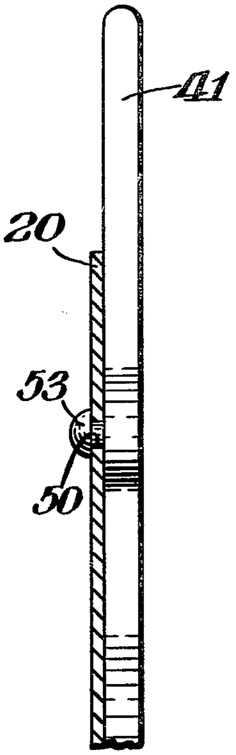
FIG. 5 is a view similar to FIG. 4 illustrating an alternate means of attaching the spike to the solid disc.

In FIGS. 3 and 4, a bore 50 in the solid disc functions as a mounting location for the spikes 41. Securement of the spikes 41 to the solid disc 20 is accomplished by a rivet 51 which carries a washer 52 on the side of the plastic spikes 41. Alternatively, as shown in FIG. 5, a plastic rivet 53 formed on the plastic spike 41 may be used to secure the spike to the solid disc. Also, a separate plastic rivet 53 may be used which after passing through the bore 50 in the solid disc 20 is secured to the spike by heat deformation to thereby provide a firm connection between the solid disc 20 and the plastic spike 41.

What is claimed:

1. Apparatus for aligning chips in the production of chipboards into a preferred direction by means of vertical aligning plates arranged parallel at a distance from and adjacent to each other with rotating shafts arranged above the aligning plates perpendicular to the preferred direction parallel and at a distance from and adjacent to each other on which spacing discs, spiked discs, solid discs and spiked discs are arranged alternately in the same sequence, characterized in that each solid disc carries mountings for spikes of the spiked discs on at least one face thereof and at an angular distance of 180° apart.

2. Apparatus according to claim 1 characterized in that the mountings on the two faces of the solid disc arranged at an angular distance of 180° are twisted with respect to each other by an angle of 90°.

3. Apparatus according to any one of claims 1 or 2 characterized in that the solid disc is crimped at an angular distance of 180° as a mounting for the spikes.

4. Apparatus according to any one of claims 1 or 2 characterized in that the solid disc carries clips at an angular distance of 180° as a mounting for the spikes.

5. Apparatus according to any one of claims 1 or 2 characterized in that the solid disc has several bores each at an angular distance of 180° as a mounting for the spikes.

6. Apparatus according to claim 4 characterized in that the clips are attached to the solid disc by welds.

* * * * *